United States Patent [19]
MacManus

[11] 3,878,992
[45] Apr. 22, 1975

[54] DECORATING HEAD
[76] Inventor: John MacManus, 143-16 - Twenty-second Rd., Whitestone, N.Y. 11357
[22] Filed: Apr. 11, 1973
[21] Appl. No.: 349,991

[30] Foreign Application Priority Data
Apr. 14, 1972 United Kingdom............. 17370/72

[52] U.S. Cl. .............. 239/553; 425/463; 425/464; 118/24
[51] Int. Cl............................................. A23g 3/28
[58] Field of Search .......... 425/463, 464, 382, 198, 425/363; 239/553, 590, 449, 428, 536, 550, 554, 590.3, 590.5; 118/24, 300, 319; 222/330, 464

[56] References Cited
UNITED STATES PATENTS
1,121,434  12/1914  Westerman.................. 425/463 X
2,398,729  4/1946  Taylor et al. ................. 425/463
2,782,735  2/1957  Anderson...................... 425/464
3,230,906  1/1966  MacManus .................. 118/24 X
3,230,926  1/1966  MacManus .................. 425/382 X
3,343,505  9/1967  Lathey et al................. 118/24 X
3,724,984  4/1973  Jernigan....................... 425/463 X
3,782,878  1/1974  Hudson......................... 425/464 X
3,796,378  3/1974  Flater............................ 239/449 X Primary Examiner—Francis S. Husar
Assistant Examiner—David S. Safran

[57] ABSTRACT

A decorating head is provided with an array of nozzles for dispensing a highly aerated food product. An internal deflector is provided to direct the product to the periphery of the head. A central distributor directs another portion of the product outwardly across the bottom wall to provide wide distribution. At the inlet to each nozzle is an orifice which produces uniform extrusions of product from each nozzle.

23 Claims, 10 Drawing Figures

DECORATING HEAD

The invention is concerned with a decorating head for use in depositing a stiff fluent aerated food product. such as diary whipped cream, vegetable whippable emulsions, egg whites or albumen mixtures such as souffles and meringues containing sugars and other sweeteners, so called light type butter creams, and other vegetable fat cream icings, on or into units of pastry, cakes, deserts, or other confectionery to decorate or fill them.

The decorating head is hollow with an inlet in its top or side walls, but preferably in its top wall, through which the whipped cream or other food product is pumped into the head, and an array of star-type or other outlet nozzles is mounted in its bottom wall through which the product is extruded onto or into the confections. In use the decorating head remains full of a minimum amount of product and when the head is positioned overlyaing a confection, the product is forced into the head by a pump or other means through the inlet for a controlled period of time during which a corresponding amount of product in variable controlled weight is extruded out of the nozzles onto the confection. The head is then, as a result of vairous mechanical programmed control procedures which may be electrically, hydraulically or pneumatically operated, brought into register with another unit and the cycle is repeated. The process may be manually performed when minimal quantities are needed.

One great difficulty which arises in using such a head, particularly when the head is supplied from but one machine, is that of equalizing the pressure and flow of the product in the head and compensating for the different distances which the product has to travel within the various sized heads, which may be from one inch to 12 inches in diameter, from the inlet to the different nozzles to ensure that each individual nozzle is proportionately fed, particularly when the outlets are not arranged in a simple even array, which is sometimes necessary for influencing the beauty and design effect which attracts customers. The quantity of product extruded from each set of nozzles is not necessarily the same, area by area, because of the different number and variety of design patterns. Another difficulty arises from the enormously diverse nature of the products to be processed, and from the unstable nature of the products, i.e. within themselves, particularly when it is a high air-bearing whipped cream or other light whipped emulsion type product because unless the product passes through the head in a "first in - first out" manner, static pockets of the product or air will form in the head. This leads to unevenly spaced particles which progressively causes spluttering and solidification, which in turn ruins the objective of offering for sale a uniform product of high eye appeal value. In the case of a high air overrun productt such as whipped cream, separation of the air and liquid product leads to extrusion of lumps of butter or spluttering and plugging up of the outlet nozzles. This spoils the design of the finished end products which are not acceptable for sale. The labor involved in dealing with the repeated stoppages in the production cycles, when these problems arise and reoccur, as they have always done heretofore, causes great expense.

In accordance with the present invention, in a hollow decorating head for use in deposition a stiff fluent aerated food product and having an inlet through which product may be supplied to the head under pressure and, in its bottom wall, an array of outlet nozzles, the entrance to each nozzle is provided with a constriction through which the product passes into the nozzle, and there is a deflector mounted in the path of the product entering the head through the inlet, the deflector being shaped so that it divides the incoming flow of product, a first part of the product being caused to flow outwardly over the deflector and downwardly to the nozzles in the bottom wall through a gap between the peripheral edge of the deflector and the peripheral wall of the head, and a second part being caused to flow through the deflector into a static distributor which directs a second part of the product to flow outwardly over the bottom wall.

In this specification the term "nozzle" is used in its broadest sense to mean any outlet for extrusion of product.

Most surprisingly the provision of the constrictions through which the product must pass from the interior of the head into each individual nozzles compensates for inevitable variations in the pressure of the product within the head and produces a very uniform extrusion of product from each nozzle. The constrictions produce an appreciable pressure differential between the interior of the head and the interior of the nozzle, which is substantially at atmospheric pressure. This appreciable pressure differential causes a substantial equalization of pressure within the head prior to build up of the pressure differential between the interior of the head and the nozzles for extrusion. Alternatively, an analogy may be drawn between the mechanics of the system and theorectical "unaffected" flow of a gas through a narrow plate orifice to a region at a pressure less than the critical pressure for ideal flow. Under such circumstances the material flowing through the orifice expands only to the critical pressure irrespective of the upstream pressure. To the extent that this ideal gas flow theory is relevant in the present context, the product flowing through the constrictions into the nozzles arrives in the nozzles at a constant pressure irrespective of the variations in the product pressure in the head thus ensuring uniform extrusion out of the nozzles.

The analogy can be taken a step further in that for ideal gas flow conditions through a narrow orifice, there is preferably a convergent entrance to the orifice and I find that the uniformity of the flow from the nozzles of my decorating head are also improved if the entrance to each constriction is convergent.

When the nozzles are conventional convergent tubular nozzles, the constrictions at their upstream ends may be provided by small orifices in a restricter plate which overlies the nozzles at the bottom wall of the head with one orifice in alignment with each nozzle. This is an apropriate construction when the nozzles are located in position by means of a pair of plates in the base of the head, the tubular bodies of the nozzles extending downwards through orifices in the lower plate, with which they form a design plaque, and having their larger upstream ends, which may be formed with outwardly extending flanges, clamped between the lower plate and an upper restricter plate in which the orifices are formed.

In an alternative and preferable construction the constrictions are each provided by an orifice in a disc which is mounted across the entrance to the corresponding nozzle. This is an appropriate construction if the nozzles are mounted in a single plate having apertures from which the tubular bodies of the nozzles extend downwards, the edges of the plate around the nozzles being swaged over the upper ends of the nozzles. The discs may then be inserts mounted on top of the nozzles and also held in position by the swaging. The plate, nozzles and discs then form an integral design plaque.

Other techniques may be used for fixing the nozzles in the single plaque. For example, the nozzles may be screwed into tapped holes in the plate or, if made of metal, may be soldered or force fitted in position. The orifices may then be provided in disc of plastics, stainless steel, or other non-toxic material, which are held in the plate by the nozzles or otherwise, or the orifices may be provided as integral parts of the plate itself.

Although the cross-sectional area of the bottom wall of the head in which the nozzles are provided may vary over a wide range, this will in general result in a variation in the number of nozzles rather than in a wide variation in the size of the individual nozzles. In a typical example the nozzles will be provided at three-fourths inch centers and each nozzle will taper from a diameter of one-half inch at its upstream end into which the constriction leads, to a diameter of one-fourth inch at its downstream end which may, of course, be shaped in a star or other configuration to control the cross-sectional shape of the extruded product. The corresponding constriction in the form of a circular orifice having a minimum diameter of between one-sixteenth and one-eighth inch, depending upon the product and other parameters, would then be reasonable. An appropriate relationship between the constriction sizes and nozzle sizes is that the cross-sectional area of the constrictions should not be greater than 25% of the effective cross-sectional areas of the downwstream ends of the corresponding nozzles.

By dividing the flow of product through the head, it is possible to ensure a substantially uniform supply of product to each of the nozzles which further assists in providing uniform extrusion through the nozzles. At the same time, the effective internal volume of the head may be comparatively small and this coupled with the division of the product flow, so that the product effectively scours the chamber within the head, provides a first in — first out path for the product through the head and prevents the build up of any static pockets of product or air in the head, thus avoiding any premature expansion of the product before it leaves the head.

A particular advantage arising from the use of the distributor in the center of the deflector is when the array of nozzles in the bottom wall is other than circular. For example, if the array of nozzles is square or rectangular, or indeed any other selected shape, for use in decorating a confection which is square or rectangular or otherwise shaped in plan view, the exit holes for the product from the central distributor may be positioned relatively to one another and angularly relatively to the decorating head so that all of the product, or at least a majority of the product, passingg through the distributor is directed laterally over the bottom wall towards the furthest corners of the square or rectangle or other shape. In this way compensation can be made for any irregularities in the shape of the array and arrangement of nozzles to fit any design pattern. The distributor may be provided by a ring of passages through the central portion of the deflector. Since the same decorating head may be used with different arrays of nozzles, for example by means of replaceable blanking plate inserts which cover all but a selected array of nozzles in the bottom wall of the head, provision is preferably made for enabling the distributor, which may cause turbulent flow, to be easily replaceably mounted in the deflector, to avoid the need to replace the whole deflector. For this purpose the deflector may incorporate a central bush into which is received a hollow spigot of the distributor. The spigot may be located in position in a predetermined angular orientation. Of course in extreme cases of variation in the width, quantity, or length of the array of nozzles, it may be necessary to block out whole portions of the interior of the decorating head and in that case the deflector may have to be replaced by one of a different shape as well. Thence under some circumstances it may be necessary for a deflector to be provided with two or more distributors adjacent to its central portion for conducting the second part of the product flow.

In one satisfactory construction the deflector is a horizontal plate and the distributor is mounted at the bottom of a tubular portion which projects downwardly from the center of the plate, and the peripheral edge of the inner top wall of the head curves downwardly to assist in directing the first part of the divided product intermittently or continuously and smoothly down around the peripheral edge of the deflector plate, thus forcing the major portion of the stiff whipped product to the extreme perimeter of the head. Preferably the special center distributor discharges the second part of the divided product substantially horizontally and outwardly away from the center of the bottom wall substantially immediately above the bottom wall. The turbulent motion caused by the distributor outlets provides desirable agitation in the center of the head and keeps all the parts of the product in motion as it flows in the opposite direction to the product which is passed around the periphery of the deflector plate and inwardly over the bottom plate. In this way no static pockets of product are set up in any part of the head and thus smooth saleable end products are assured.

The head may be a moulding from synthetic plastics material such as nylon, or a casting from metal of acceptable food grade, or may be formed from stainless steel, for example by spinning. In any case its top and side walls preferably provide thermal insulation, and in some cases the bottom wall as well.

The product supply to the inlet of the head is preferably provided with a check valve which seals the interior of the head and avoids expansion of the product when the programmed supply of product to the head is interrupted during a cycle operation. The valve may be provided at the head inlet but is preferably provided at the outlet of for example a whipping machine to which the head inlet is connected by a conduit which may be of non-flexible material or a flexible hose. In special circumstances valves will be provided at both positions. In any case a magnetic or spring loaded non-return ball valve or its equivalent is appropriate.

Depending upon the required rate of product flow and the capacity of the head and machine supplying the head with product, a single head may be supplied with product from one or more machines. When a single head is supplied from a number of machines, the supply conduits from the separate machines may unite in a common manifold before entering the head through a single inlet. In this case the check valve, when used is preferably provided downstream of the manifold. Alternatively the supply conduits from the various machines may lead into a number of separate inlets in the head. The inlets may discharge above a common baffle but alternatively they may each discharge above their own separate baffle in the head, each baffle dividing the flow of product from its own inlet into first and second parts. For example a possible configuration would involve five inlets in the top wall of the head and consisting of a central inlet and four equiangularly spaced inlets around the central inlet and approximately midway between the centre and periphery of the top wall. Depending upon the requirements and pattern of the deposit, one or more of the inlets may be blocked off.

The use of a number of separate inlets to the head leads to the possibility of dividing the interior of the head into a number of separate compartments by one or more preferably removable vertical partitions. Each partition may be clamped between and sealed to the top and bottom walls of the head and extend fully between the top, side and bottom walls of the head to which it may be sealed by a gasket. Alternatively the partitions may be part of an integral insert. The inlets will then lead into different compartments enabling product with different characteristics, such as differently colored and flavored product, to be fed to the individual compartments so that product of one character will be extruded through one group of nozzles onto a confection and product of a different character will be extruded through a different group of nozzles onto a different part of the same confection. This leads to very great versatility of decoration for confectionery.

A cake or other confection decorated by means of the decorating head may rest on any appropriate support but preferably the hed is used in conjunction with a platform, such as a grid, which can be raised and lowered below the head. It is then possible to raise the confection close to the bottom wall of the head, start the extrusion of the product through the nozzles onto the top of the confection and slowly lower the confection on the platform as the product is extruded downwards through the nozzle. This enhances the appearance of the decoration, particularly if the nozzles are conventional star nozzles or other special designs.

The platform is preferably raised and lowered on a base having an upstanding part on which the decorating head is mounted. This ensures proper alignment between the decorating head and a confection on the platform. In a preferred construction the platform is a grid which rests on a sub-frame that is constrained by a parallel motion linkage to move upwards and downwards relatively to the base upon manual or automatic operation of an actuating member, the grid being guided so that is moves vertically upwards and downwards upon swinging movement of the sub-frame. The base of the platform may be free standing or it may be supported from the whipping machine with which the head is used, for example by being slung from the product feed conduit between the homogenizer of the whipping machine and the inlet to the decorating head.

In some cases it is desirable not only to deposit whipped cream or other product on top of the cake or other confection but also on the side wall of the cake or confection. Previously, the decoration of the side of the confection has had to be carried out manually. However, in accordance with a further aspect of the invention, the decorating head is provided with an auxiliary hollow decorating head having an inlet which is coupled via a duct to a duct through which the inlet of the main head is fed, the auxiliary head providing one or more outlet nozzles directed radially inwardly of the main head from a position to the side and below the main head. Using this equipment, both the top and sides of a circular confection can be decorated from a single supply. Valving may of course be utilized so that the product is selectively directed through one or other duct to the main or auxiliary head respectively, if the top and side of the confection are not to be decorated simultaneously.

In order that the whole periphery of the cake may be decorated by means of the auxiliary head, the auxiliary head may be mounted so that it moves in circular fashion around the periphery of the main head, the duct through which the inlet of the auxiliary head is supplied with product being flexible to allow such movement or connected through a flexible coupling to the duct through which the main head is supplied. Alternatively, the auxiliary head may be mounted in a stationary position and the confection may be decorated while resting on a turntable which rotates to carry the peripheral wall of the confection successively past the auxiliary head.

A decorating head in accordance with the invention is capable of handling the high output rate product from a cream whipping machine, hereinafter referred to as of the new kind, which has a pump that simultaneously draws in liquid product and air and discharges them through a static narrow orifice homogeniser, and an improved version of which is protected by my U.S. Pat. No. 3,606,266. The head or heads may be rigidly fixed to the machine outlet or they may be connected to the outlet by means of a flexible hose or hoses as described in my U.S. Pat. No. 3,632,021.

The extraordinary technical advance which is achieved by the new decorating head, particularly when used in conjunction with the new whipping machine will be apparent from the following considerations.

The diverse nature of the various different types of whipped product is such that inherently it requires in every country a series of different type machines to accommodate the manifold problems in processing bakery, confectionery, and other desert products, these products depending upon the total solids content, the viscosity, the fluency, the non-fluency, and granulation in the form of crystalline sugars or powder stabilizers within the products being processed.

These salient points are illustrative and do not cover the total diverse problems involved in trying, for the sake of simplicity and efficiency, to accommodate the possibility of making a decorating head that with minor inexpensive changes can accomplish the successful processing of each type of product. In the new decorating head according to the invention I have managed to accomplish the handling of all the products referred to in the introduction. The head is universal in the sense that it can be attached to diverse equipment and give superior results when compared with any decorating head which now exists in the baking and confectionery and desert fields.

It is important to explain that dairy cream almost immediately after the final whipping stage "sets up" and later "stands up" after being applied to a confection for a period of time when properly processed. However, it must be recognised that great difficulty arises after the cream has been whipped to its so called optimum practical volume, which changes with a positive relationship to the amount of its butter fat content, and also depends upon the addition of any stabilizing agents which are permissible under existing laws. If it is accepted that when the desirable optimum has been accomplished at the end of its whipped stage, the question then arises on how you transfer the cream for any distance and then expand it through a discharge means into a decorating head which may vary in diameter from one inch to twelve inches without affecting its so-called optimum structure and its fragile "stand up ability" over a period of time, particularly after it has been spread out and forced through for example up to 150 outlet nozzles simultaneously. The weight may only be 8 ounces expanded over this great area in say a 10 inch diameter cake. The new decorating head can accomplish this.

The change in the specific gravity compared with all known regular processes wherein the cream is whipped separately and is then transferred by some means to a depositing unit, is superior when using my new decorating head and generally the cream has a lower bacteria count, which is important under tightening pure food laws to obtain non-toxic foods.

It must be appreciated that the vegetable whippable type creams or emulsions are entirely different in their characteristics from dairy whippable creams. The "set points" on these vegetable type creams will vary, after whipping, for example some will set in 10 seconds, others in 20 seconds, and others in five minutes. The quick setting types of products create the greater problems. Accordingly there has been a lack of outstanding success in decorating with these particular types of creams except by hand and bag means, the difficulties being mostly related to the different set points which in turn are caused by the galaxy of permissible formulations and combinations of entirely different ingredients to serve the same purposes, that is to make a whipped topping. Another problem is the different concepts in formulation in different countries. Many of the concepts are conditioned by governmental controls on the food additives which are permitted to be used. With the use of my decorating head all these problems are overcome in the handling of vegetable emulsion type creams just as they are in the handling of dairy creams.

In the combination of the new decorating head with a cream whipping machine of the new improved type referred to, the cream is whipped and fed directly to the decorating head and in turn directly on or into cakes, deserts, and the like, without the necessity of having to purchase and use a second machine to transfer the whipped cream into a depositer and then onto the product. This fact in itself creates the opportunity for the highest sanitary standards and, most importantly, it replaces the use of two expensive machines, namely a whipping machine and also a depositing machine which would otherwise be necessary, yet this new method is done by the use of a single comparatively inexpensive machine. In addition the end products are superior in design appearance, are lower in bacteria counts, and have greater uniformity in every appearance sense.

In my U.S. Pat. No. 3,230,906, issued Jan. 25, 1966, there is disclosed in cream depositing machine having a decorating head. That decorating head, although satisfactory when used with the large depositing machine disclosed in said patent, could not function properly and give constant commerical results when used with a cream whipping machine of the new kind referred to for the following reasons:

i. In accordance with the above-mentioned patent, the exact amount of aerated product required per unit, and which had been previously whipped by a separate large expensive whipping machine, was delivered directly at a controlled rate into the depositing machine the rate was between one and 20 lbs. per minute. The product was suddenly forced through and into the decorating head and then just as suddenly into or onto the confectionery in selected portion amounts of practically any weight value, i.e. within the design capacity.

ii. These actions occurred and were possible because the large piston size and cylinder diameter in the depositing machine could be set to deliver portions from 1 ounce to 12 ounces in weight per cycle, depending on the product being used and its overrun factor. Also the cycle speeds were variable from 3 to 100 strokes per minute and the machine discharged either the smallest quantity or the largest quantity at exactly the same speeds and the action was crisp and sudden.

iii. With reference to (i) and (ii) above, the reason for the success of the decorating head of the above-mentioned patent was the fact that instantly the selected quantity by weight of aerated product was collected by the specially designed type of piston on the upstroke. (This could be arranged to be done in reverse also.) The product was discharged instantly into the decorating head and simultaneously through the baffles and decorating nozzles in exactly the same equivalent quantities as the intake amount directly onto or into the confectionery. The result was great uniformity of design throughout the end result.

iv. The variable speed of the machine, being air operated, was one to 10 cakes per minute with one operator, with pastry products with maximum sizes up to 7½ inches in diameter.

v. The maximum when the machine was automatically controlled on products as in (iv) above was 35 cakes per minute. However by using a specially designed Colborne type plate recessed conveyor the speed of this unit could be increased to fifty per minute without any deleterious vibrations or crippled products.

There is a substantial difference, and manifold problems occurred, in making one machine do the work of two machines or more which had always been used in the processing of dairy creams, whippable emulsion creams, and the other products mentioned. In the combination of my new decorating head with a whipping machine of the new improved type, I am surprisingly able to accomplish even more superior results than when using a large whipping machine as described in my U.S. Pat. No. 3,209,554, issued Oct. 5, 1965 and the depositing machine of U.S. Pat. No. 3,230,906 together. Yet these two machines in themselves have been recognized as being a superior combination to other types of machines for handling whipped products, especially either dairy or vegetable emulsion types.

The decorating head described in U.S. Pat. No. 3,230,906 contained approximately 16¼ ounces of cream and the related method was a shock type of collect and discharge while the machine was operating at any product discharge rate on any speed cycle.

The total amount of cream in the new decorating head operating with a whipping machine of the new improved type is entirely different. In the new combination there is a minimum amount of cream, approximately 3¼ ounces, in the head at all times, and a major principle is that the cream passes through the head on a "first in - first out" basis; this being possible because of the narrow constrictions through which the cream passes to the nozzle outlets which maintain a comparatively high cream pressure in the head.

An important change in the principle of the new combination is the use of one machine in which the rate of output product is less per minute than with the earlier type of whipping machine but the machine discharges directly into the new type of head on a controlled portioning basis for an indefinite, but adjustable length of time. This feed from the new type of whipping machine to the decorating head can be termed a "trickle" type of feed. I have found that this creates great difficulty in arriving at an acceptable design of the end product but I have solved this problem in the new head which has enabled me to overcome the apparent problems and obtain a superior result.

Unlike the decorating head described in U.S. pat. No. 3,230,906, an important feature of the new head is the static distributor in the center of the deflector plate. This distributor creates a high velocity agitation of whipped product in the center of the head even although only a proportion of the total amount of product passes through the central distributor.

In this important central area of the head, and in order to phase properly the equalization of the pressure, the central static agitating distributor prevents the build up of previously whipped product in any area of the head or at the nozzles. This elimination of any resemblance of build up is important, otherwise the narrow constrictions leading into the outlet nozzles will plug up and the individual nozzles will be starved of product creating inaccurate and unacceptable product designs.

Some examples of decorating heads constructed in accordance with the invention are illustrated in the accompanying drawings, in which:-

Figure 1:
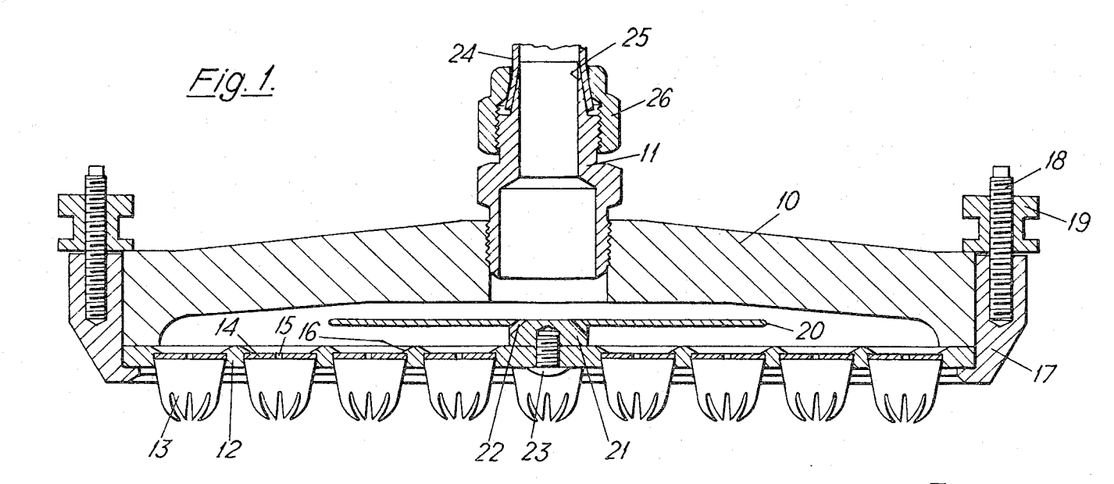
FIG. 1 is a central vertical section through one example.

The first example has an integral top wall and side wall 10 provided with an inlet 11 in the form of a screw-in tubular spigot. The bottom wall of the head has a plaque formed by a plate 12 star with a closely spaced array of convergent tubular starr outlet nozzles 13. The upstream end of each nozzle is approximately one-half inch in diameter and the effective cross-sectional area of the downstream end of each nozzle is one quarter inch. During assembly each nozzle 13 is inserted downwardly into complementary apertures in the plate 12 until the upper wider ends of the nozzles come to rest in the plate. A nylon disc 14 formed with a central constricted orifice 15 approximately one-sixteenth inch in diameter, is then fitted into the top of each aperture above each nozzle and each nozzle and disc is located in place by swaging over the material of the plate 12 as shown at 16. The plate, nozzles and discs then form an integral assembly. This assembly is removably attached to the part 10 by means of a flanged ring 17 which is drawn up to clamp the edge of the plate 12 against the side wall of the part 10 by means of six studs 18 and knurled wheels 19.

The head is provided internally with a deflector plate 20 formed integrally with a distributor boss 21 which is provided with a ring of eight passageways 22. The deflector 20 is held in position by means of a screw 23 which is screwed upwards through the plate 12 into a tapped hole in the bottom of the boss 21.

In use the head is attached to a machine preferably of the kind described in my U.S. Pat. No. 3,606,266, issued Sept. 20, 1971, either rigidly, or by means of a flexible hose 24. When the hose 24 is used the end of the hose will be pushed over a tapering portion 25 of the spigot 11 and will be trapped against the spigot by a complementary annular surface of a nut 26 which is screwed onto the spigot 11.

Whipped cream or other whipped product will then be supplied to the head through the inlet 11. The product entering the head will be divided into two parts by the deflector plate 20 so that part of the product will flow around the periphery of the plate 20 and part will flow through the ring of passageways 22. This provides a proportionate supply to each of the nozzles 13 as described. The product pressure will be maintained in the head by means of the narrow constrictions 15 through which the product will have to pass before it being extruded through the nozzles 13.

The head can readily be stripped down for cleaning by undoing the knurled wheels 19 and removing the plate 12. The plate may then be readily replaced by another plate having a different array of nozzles or the head may be refitted with a different deflector plate 20. If necessary the distance between the underside of the deflector plate 20 and the top of the plate 12 may be adjusted by providing shims on the screw between the plate 12 and the boss 21.

Figure 2:
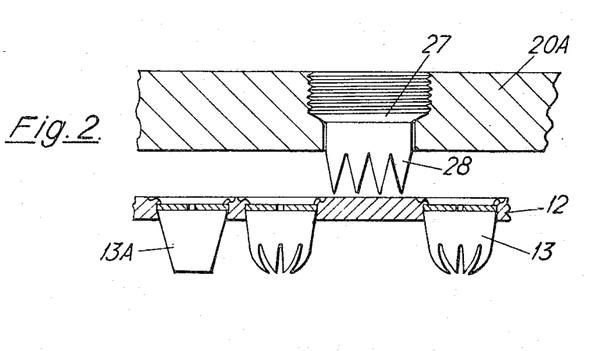
FIG. 2 is a similar section of part of a second example.

FIG. 2 shows a modification in which the deflector plate 20 is replaced by a somewhat thicker plate 20A which may be attached to the underside of the part 10 by means of appropriate screws and spacers. The importance of this modification is that the distributor is provided by a tubular plug 27 which is screwed downwards into a tapped countersunk bore in the plate 20A and has a projecting star nozzle-like distributor portion 28. The second part of the divided product will in this case pass down through the tubular plug 27 and will be distributed, in amounts depending on the selected size of the distributor inlet, laterally beneath the plate 20A through the appropriately positioned apertures in the side wall of the part 28.

In FIG. 2 an alternative form of nozzle 13A is illustrated having an outlet end of circular section of one-fourth inch diameter.

Figure 3:
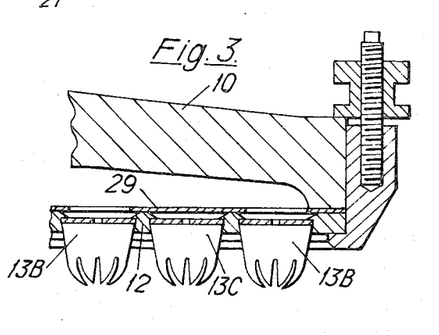
FIG. 3 is a similar section of part of a third example.

The pattern of deposit from the head may be varied by inserting in that head on the plate 12 a blanking plate 29 as shown in FIG. 3. The plate 29 covers a selected number of nozzles, and leaves others uncovered thus in FIG. 3. Two nozzles 13B are shown uncovered and nozzle 13C is shown covered. In this way the head can be arranged to deposit onto a cake or desert for example a number of concentric rings of product, or in the case of either a round, rectangular, or other shaped head, a number of spaced straight or diagonal lines of product. If the lines of product include at least a peripheral line and perhaps one or more internal lines of product, these lines will form dams of product on the surface of the confection and the areas between the dams may be filled with other fillings, such as jams, jellies or chocolate. Some configurations will be described later with respect to FIGS. 9 and 10.

Figure 4:
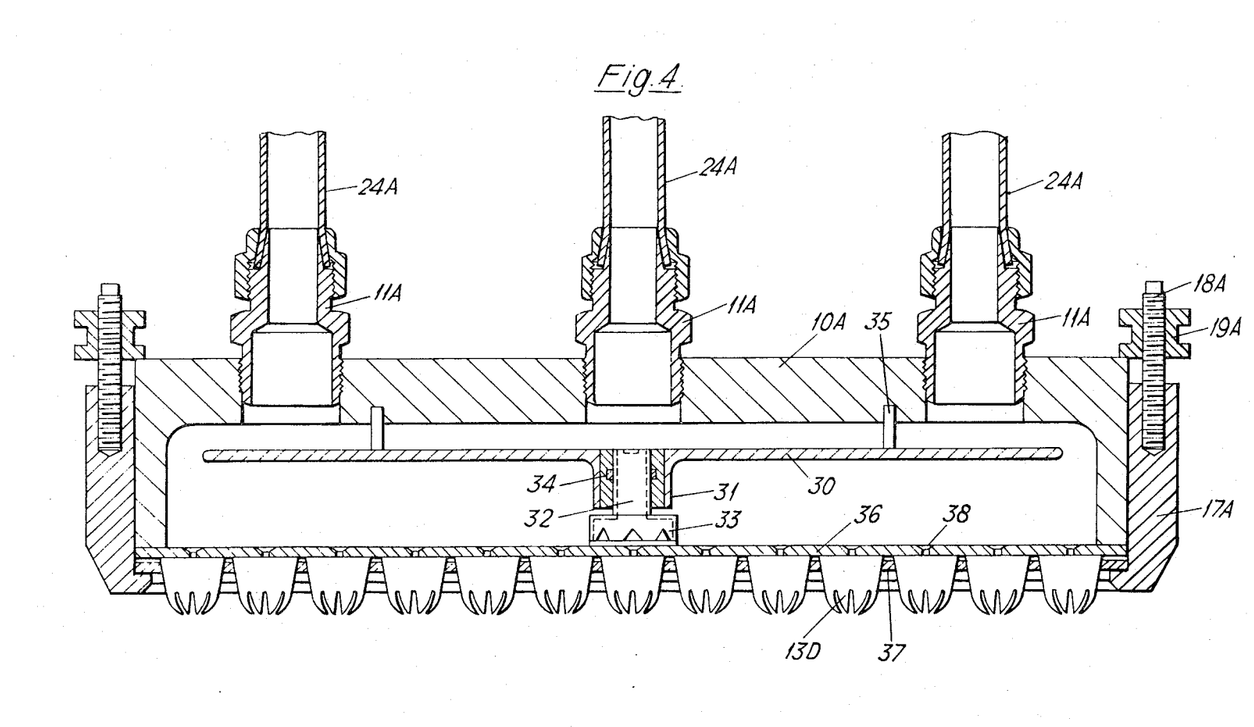
FIG. 4 is a similar section through a fourth example.

In the example illustrated in FIG. 4, parts 10A, 17A, 18A, and 19A correspond to the parts 10, 17, 18 and 19 respectively in the FIG. 1 example. In this case, however, instead of a single inlet 11 there are five inlet spigots 11A. One inlet is in the centre of the top wall of the head and the other four inlets are positioned at 90° intervals around the central inlet. Other numbers of inlets would, of course, be equally possible. Each inlet is supplied with product through a hose 24A from a separate whipping machine.

In this example a single deflector plate 30 is shown having a boss 31 which receives a replaceable, variable sized inlet-holed tubular distributor plug 32 formed with a peripherally apertured distributor head 33. The angular orientation of the plug 32 is determined by means of a transverse pin 34. The angular orientation of the deflector plate 30 is determined by means of projections 35 which are located in apertures in the part 10A, the plate 30 and the plug 32 being held up by means of a restricter plate 36.

In the case of a multi-inlet head, it would be equally possible for each inlet to be provided with a deflector plate 30 onto which it discharges, rather than all the inlets discharging onto a single deflector plate.

In the FIG. 4 example the nozzles 13D are similar to those of the FIG. 1 example and are inserted downwards through a plate 37 formed with a closely spaced array of complementary apertures. The nozzles 13D are clamped into position by means of the overlying restrictor plate 36 in which narrow orifice constrictions 38, one in alignment with each nozzle 13D, are formed, corresponding in function to the orifices 15 in the discs 14 of the FIG. 1 example. The entrances to the orifice 38 are countersunk in frusto-conical convergent fashion. The nozzles 13D are thus trapped between the plates 36 and 37 and the sandwich is clamped between the side wall of the part 10A and the flange at the bottom of the ring 17A.

When the head is other than circular in plan, or when a blanking plate 29 is used, so that the nozzles are not symmetrically arranged all around the deflector plate and distributor, the distributor may be arranged to direct product preferentially in different directions across the bottom wall of the head. For this purpose the passageways 22 in the FIG. 1 example may be other than equiangularly oriented around the axis of the head and in the FIG. 4 example the apertures in the distributor head 33 may similarly be unsymmetrically arranged. To allow for the use of different blanking plates in a common head, the distributor together with the deflector plate in the FIG. 1 example, and separately from the deflector plate in the FIG. 4 example, may be replaceable by one of a different configuration.

Figure 5:
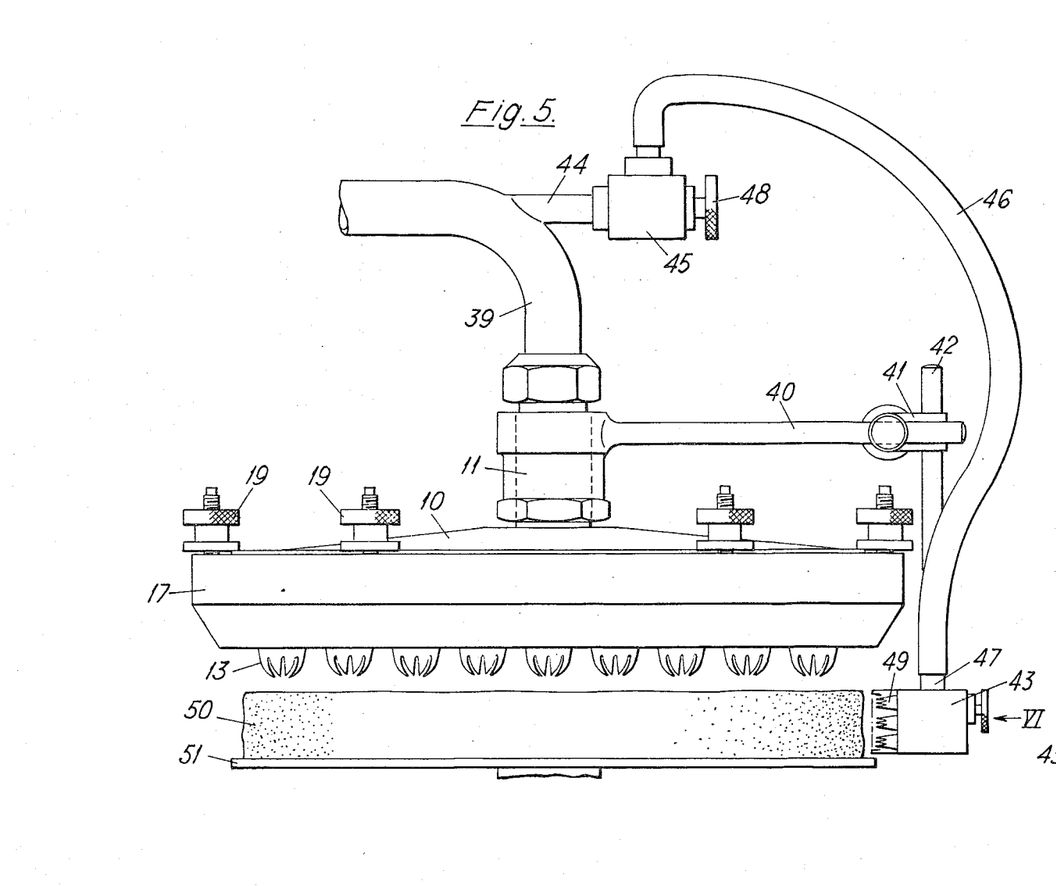
FIG. 5 is a side elevation of a modified form of the FIG. 1 head.
Figure 6:
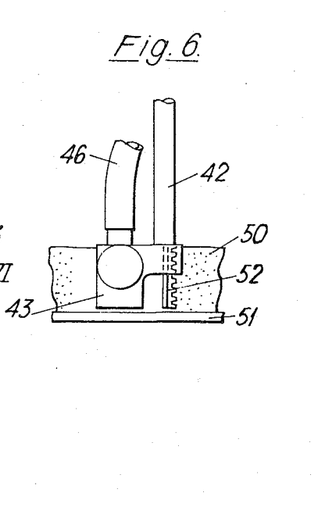
FIG. 6 is a partial side elevation as seen from the arrow VI in FIG. 5.

FIGS. 5 and 6 show a modification of the FIG. 1 example in which the inlet 11 of the head is supplied with product from a whipping machine through a rigid pipe 39. A radial arm 40 extends from the inlet spigot 11 and carries through a bracket 41 at an adjustable height a leg 42 on the bottom of which is mounted an auxiliary hollow decorating head 43. A branch 44 of the pipe 39 leads to the inlet of a valve 45 the outlet of which is coupled through a flexible hose 46 to an inlet 47 of the auxiliary head 43. When the valve 45 is open, by pulling outwardly a finger piece 48, product is supplied not only to the main head but through the pipe 46 to the auxiliary head 43 from which it is extruded through nozzles 49 to decorate the side of a confection 50 the top of which is decorated by the main head. The inlet 47 may include a spring loaded ball valve which opens under the pressure of the product supplied through the hose 46.

The connection between the arm 40 and inlet spigot 11 may be a rotary connection so that the head 43 can be swung around the side of the main head and confection 50, such freedom being possible owing to the flexibility of the hose 46. In this way the whole of the side of the confection 50 may be decorated. Alternatively, and preferably, the confection 50 may be mounted on a turntable 51, as described for example in my U.S. Pat. No. 3,724,417, issued Apr. 3, 1973, which enables the confection to be stopped and raised to receive its top decoration and then lowered and spun to receive its side decoration. In that case the auxiliary head 43 will be mounted in a fixed position relatively to the main head.

Additionally, as shown in FIG. 6 a comb 52 may also be carried by the arm 42 to comb the whipped product deposited by the nozzles 49 on the side of the confection as the confection on the turntable and/or the auxiliary head rotate relatively to one another.

Figure 7:
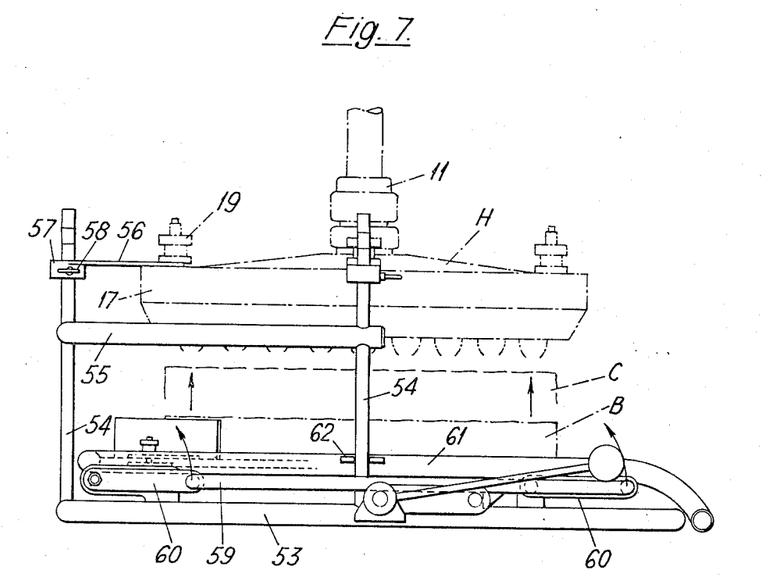
FIG. 7 is a side elevation of ancillary equipment for supporting the decorating head and confection.
Figure 8:
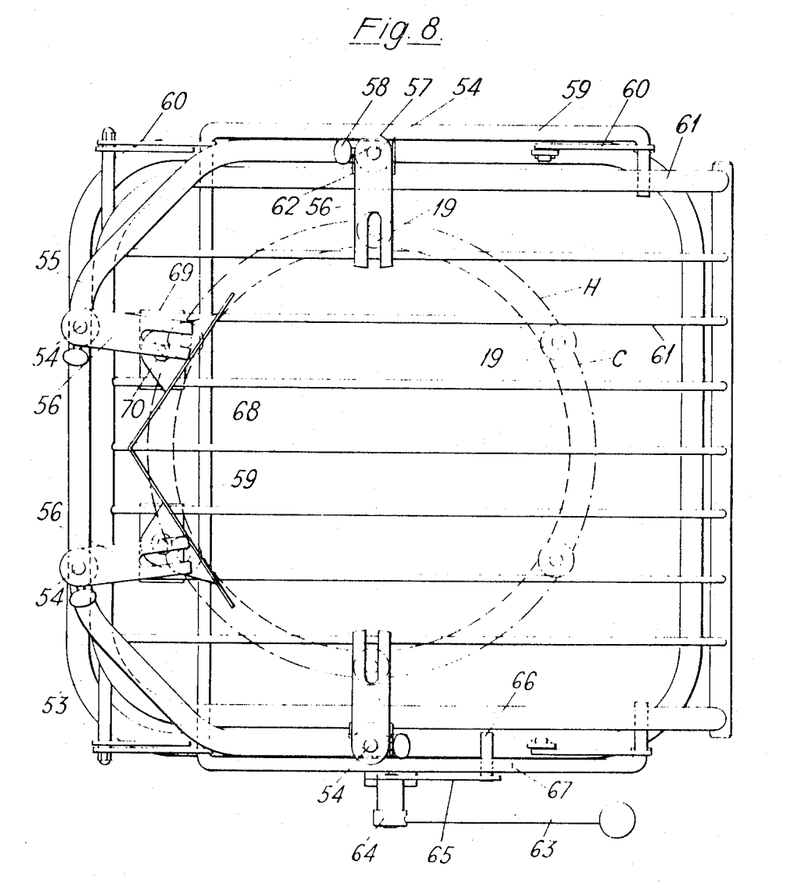
FIG. 8 is a plan of the ancillary equipment shown in FIG. 7.

FIGS. 7 and 8 illustrate the FIG. 1 head in combination with a supporting device. The device comprises a base 53 which rests on a table and which is provided with four upstanding posts 54 strengthened by a half frame 55. The decorating head H which is shown in phantom lines, is supported from the posts 54 by means of bracket 56. Each bracket 56 has a bush 57 which is slidable upwards and downwards on a corresponding post 54 and can be secured at a fixed height by means of a screw 58. At its other end each bracket 56 is bifurcated and is clamped between a corresponding one of the knurled nuts 19 and the top of the ring 17. The head may therefore be secured in position at a selected height.

A horizontal sub-frame 59 is supported from the base 53 at its four corners by means of four similar pivotal links 60 which provide a parallel motion linkage so that the sub-frame 59 can swing upwardly and downwardly while remaining horizontal. Resting on the sub-frame 59 is a grid platform 61 having at each side ears 62 which embrace two of the posts 54.

The sub-frame 59 may be raised and lowered by means of a handle 63 which is pivoted at 64 on the base 53 and which is rigid with a lever 65 having a finger 66 engaging beneath the sub-frame 59. By raising the lever 63 the lever 65 and finger 66 push the sub-frame 59 upwardly carrying the grid platform 62 with it. The grid platform 61 is constrained to move vertically, rather than following the swinging movement of the sub-frame by means of the ears 62.

Pulling the lever 63 downwardly again lowers the grid platform. The sub-frame and grid platform are prevented from being retained in the top dead-center position with link 60 vertical as a result of the finger 66 engaging not only the underside of the sub-frame 59 but also over an ear 67 carried by the sub-frame so that when the finger 66 is lowered it pulls the sub-frame down with it again.

An angular guide 68 may be fixed in a selected position on the grid 61 by means of clamping plates 69 which are drawn up by knurled nuts 70 against the underside of the grid platform 61. In use a confection C resting on a base B is pushed onto the grid platform 61 from the right-hand end as seen in FIG. 8 until the base abuts the guide 68. The confection C is then centered beneath the decorating head H. The handle 63 is manually or mechanically pushed upwardly to being the top of the confection adjacent to the nozzles at the bottom of the head H and product extrusion is commenced. As the product is extruded from the nozzles onto the confection the handle 63 is gently lowered so that at no time does the product have to drop nor does the product between the nozzles and the top of the confection build up messily around the nozzles. At the end of a decorating operation the supply of cream or other product to the head is stopped, the handle 63 is fully lowered, and the confection C on the base B is removed, the gap between the bars of the grid platform 61 being sufficiently wide to allow the operator to insert his fingers.

In order to clean the grid platform 61, it may be removed by tilting it sideways so that one pair of ears 62 is raised out of engagement with its complementary post 54, when the sub-frame 59 is in its lower position.

In a modification the head is supported from the outlet of the whipping machine by means of a rigid pipe through which the head is supplied with product from the machine. The base of the platform is then rigidly attached to the pipe and by clamps to the front legs of the whipping machine. The posts 54 are then unnecessary except for two short side posts for guiding the vertical movement of the grid.

Figure 9:
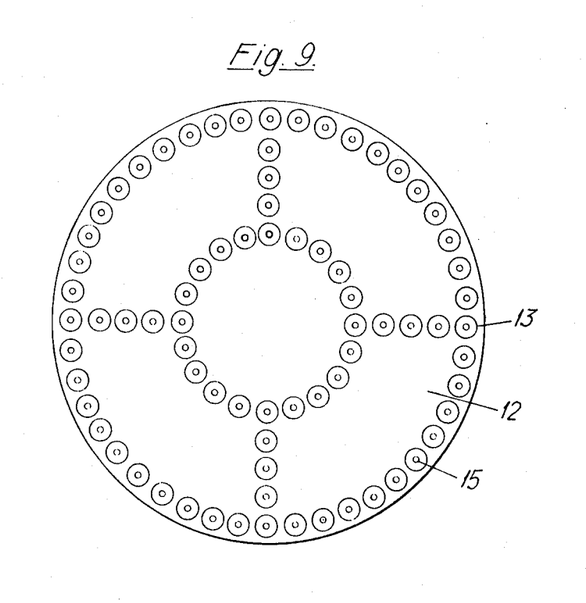
FIG. 9 illustrates one special nozzle array.

FIG. 9 shows a design plaque which may be constructed for example as in the FIG. 1 example, for use as the bottom wall of the head. The plaque consists of a plate 12 in which an array of nozzles 13 are supported, the nozzles having constricted entrances 15. The nozzles however are positioned in a special array consisting of a peripheral ring, a central ring, and four connecting lines of nozzles at 90° intervals. In use the product will be extruded onto the top of a circular confection and the array of nozzles ensures that the product is extruded in lines corresponding to the two circles and four equiangularly spaced joining lines. In practice the product extruded from adjacent nozzles will merge to an extent sufficient to form on the surface of the confection dam walls corresponding in configuration to that of the array of nozzles. As a result five areas on top of the confection will be surrounded by dam walls and a portion of filling such as jam, jelly or fruit can be flooded into each area, the dam walls containing the filling, providing decoration, and if necessary separating different fillings in different areas.

Figure 10:
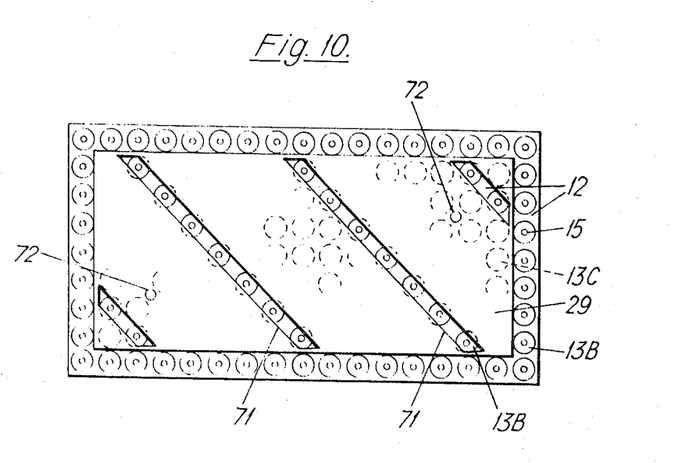
FIG. 10 illustrates another array.

FIG. 10 shows an alternative manner of achieving the same result. In this case the nozzle plaque corresponds to a rectangular head and consists of a plate 12 the whole area of which is provided with nozzles 13. A blanking plate 29 is fitted over the nozzle plate 12. The plate 29 is formed with four diagonal slots 71 and the length and breadth of the plate 29 are less than those of the plate 12. The plate 29 is located relatively to the plate 12 by means of two pins 72 which engage complementary recesses in the plate 12. As a result the entrances 15 to a peripheral line of nozzles 13B and those nozzles in alignment with the slots 71, are exposed for product extrusion whereas the entrances to the remaining nozzles 13C in the plate 12 are convered. Product extruded through the uncovered nozzles will then be deposited upon a rectangular confection to provide a peripheral dam wall and four diagonal walls defining between them areas in which fillings can be contained.

Naturally the configuration of effective nozzles can be varied at choice in either construction to provide the desired configuration of dam walls on the confection.

I claim:

1. A hollow decorating head for use in depositing a stiff fluent aerated food product onto units of confectionery to decorate them, comprising: means defining top, bottom and peripheral side walls; the top wall having an inlet through which product is supplied into the head under pressure; an array of outlet nozzles in the bottom wall; the entrance to each nozzle being provided by an opening through which the product passes into the nozzle; a deflector between the top and bottom walls and mounted below the inlet and in the path of the product entering the head through the inlet; the deflector having a peripheral edge positioned inwardly from the peripheral side wall so that a first position of the product is caused to flow outwardly over the deflector and then downwardly to the nozzles in the bottom wall through the gap between the peripheral edge of the deflector and the peripheral side wall of the head; the deflector having an opening in a central portion thereof allowing another portion of the product to flow through the deflector; and a static distributor operatively connected to the deflector opening and arranged to direct said other portion of the product to flow outwardly across the bottom wall.

2. A decorating head according to claim 1, in which the entrance opening to each nozzle is provided by a constriction the cross-sectional area of which is not greater than 25% of the effective cross-sectional area of the dowstream end of the corresponding nozzle.

3. A decorating head according to claim 2, in which each constriction is provided by an orifice in a thin plate.

4. A decorating head according to claim 2, in which each constriction is provided by an orifice having a convergent entrance.

5. A decorating head according to claim 4, including a common restricter plate in which all the orifices are provided and which overlies the nozzles at the bottom wall of the head, with one orifice in alignment with each nozzle.

6. A decorating head according to claim 5, including a lower plate having apertures, the nozzles having tubular bodies extending downwardly through the apertures in the lower plate, and the nozzles having larger upstream ends clamped between the lower plate and the restricter plate in which the orifices are formed to mount the nozzles in position.

7. A decorating head according to claim 3 in which the nozzles are supported from a single plate having apertures from which the tubular bodies of the nozzles extend downwardly, and including a thin disc mounted across the entrance to each nozzle, and the orifice for each nozzle being located in the disc.

8. A decorating head according to claim 7, in which each nozzle and disc is held in position in the plate by a swaged element extending over each disc around the nozzle.

9. A decorating head according to claim 1, in which the array of nozzles is non-circular so that some nozzles are remote from the static distributor, and the static distributor has exit holes for the product which are positioned so that the product is preferentially directed across the bottom wall toward the nozzles most remote from the distributor.

10. A decorating head according to claim 1, in which the static distributor is removably mounted on the deflector for easy replacement by another distributor.

11. A decorating head according to claim 10, wherein the static distributor has a hollow spigot, and the deflector incorporates a central bush into which the hollow spigot is received.

12. A decorating head according to claim 11, including means for locating the spigot in position in the bush in a predetermined angular orientation.

13. A decorating head according to claim 1, in which the deflector is a horizontal plate having a tubular portion which projects downwardly from the center of the plate, the distributor is mounted at the bottom of the tubular portion, and the inner top wall of the head has a peripheral edge which curves downwardly to assist in directing the first portion of the product smoothly down around the peripheral edge of the deflector plate.

14. A decorating head according to claim 1, wherein the top and side walls of the head are integrally formed; and including a ring surrounding the side wall of the head and having a radially inwardly projecting annular flange, and the bottom wall of the head in which the nozzles are mounted is clamped between the lower edge of the side wall of the head and said annular flange.

15. A decorating head according to claim 1 including a partition dividing the interior of the head into a number of compartments each communicating with a separate part of the array of nozzles in the bottom wall of the head, and the walls having an inlet communicating with each compartment.

16. A decorating head according to claim 1 including a blanking plate mounted in the head on top of the bottom wall, the blanking plate being provided with a configuration of openings providing communication between the interior of the head and the entrances to some of the nozzles but covering and closing the entrances to others of the nozzles.

17. A decorating head according to claim 16, in which the configuration of openings provides communication with a peripheral line of nozzles and at least one other line of nozzles within the peripheral line so that the product will be deposited in a manner to provide dams between which other fillings may be placed.

18. A decorating head as set forth in claim 1, wherein the bottom wall includes a lower plate having aperatures, and the nozzles have tubular bodies disposed in and extending downwardly through the aperatures in the lower plate; and including a peripheral mounting member surrounding the side walls and having an inwardly-projecting flange which underlies and supports the lower plate, a plurality of studs extending upwardly from the top of the mounting member to a level above the top wall, and means associated with each stud for supporting the mounting member on the top wall.

19. A decorating head as set forth in claim 18 including a plurality of upstanding posts depending to a level below the nozzles, and each post proximate to one of said studs and having means for attachment thereto.

20. A decorating head as set forth in claim 19 including means defining a guide for engaging the confectionery and locating it below the nozzles, and a supporting apparatus connected to said studs for holding the guide and nozzles in position relative to each other.

21. A hollow decorating head for use in depositing a stiff fluent aerated food product onto units of confectionery, comprising: wall means defining top, bottom and peripheral side walls: the wall means having an inlet through which the aerated food product is supplied into the head under pressure; an array of outlet nozzles at substantially atmospheric pressure in the bottom wall; the entrance to each nozzle being a thin plate orifice through which the product passes into the nozzle and providing an appreciable pressure differential between the pressurized interior of the head and the interior of the nozzle; each orifice having an area not greater than 25% of the effective cross-sectional area of the downstream end of the corresponding nozzle; the thin plate orifice and the nozzle being constructed and arranged to provide flow through each orifice equivalent to ideal flow;

and a deflector between the top and bottom walls and mounted below the inlet and in the path of the product entering the head through the inlet; the deflector having a peripheral edge positioned inwardly from the peripheral side wall so that a first position of the product is caused to flow outwardly over the deflector and then downwardly to the nozzles in the bottom wall through the gap between the peripheral edge of the deflector and the peripheral side wall of the head; the deflector having an opening in a central portion thereof allowing another portion of the product to flow through the deflector.

22. A decorating head according to claim 21 in which the nozzles are supported from a single plate having apertures from which the tubular bodies of the nozzles extend downwardly, and including a thin disc mounted across the entrance of each nozzle, and the orifice for each nozzle being located in the disc.

23. A decorating head according to claim 22, in which each nozzle and disc is held in position in the plate by a swaged edge of the plate around the nozzle.

* * * * *